(12) United States Patent
Boger et al.

(10) Patent No.: US 8,673,207 B1
(45) Date of Patent: Mar. 18, 2014

(54) POROUS CERAMIC HONEYCOMB ARTICLES AND METHODS FOR MAKING THE SAME

(71) Applicant: Corning Incorporated, Corning, NY (US)

(72) Inventors: Thorsten Rolf Boger, Bad Camberg (DE); Weiguo Miao, Horseheads, NY (US); Zhen Song, Painted Post, NY (US); Jianguo Wang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/079,753

(22) Filed: Nov. 14, 2013

Related U.S. Application Data

(62) Division of application No. 12/955,268, filed on Nov. 29, 2010, now Pat. No. 8,609,032.

(51) Int. Cl.
*B28B 3/00* (2006.01)

(52) U.S. Cl.
USPC ........................................... 264/630; 264/631

(58) Field of Classification Search
USPC ........... 422/177, 180; 264/630, 631; 428/116; 55/523
See application file for complete search history.

(56) References Cited

U.S. PATENT DOCUMENTS

| | | | |
|---|---|---|---|
| 4,415,344 A | 11/1983 | Frost et al. | 55/523 |
| 7,048,894 B2 | 5/2006 | Tanaka et al. | 422/177 |
| 7,575,794 B2 | 8/2009 | Faber et al. | 428/116 |
| 7,763,222 B2 | 7/2010 | Miyairi et al. | 423/239.1 |
| 2003/0224933 A1 | 12/2003 | Kondo et al. | 502/439 |
| 2004/0206044 A1 | 10/2004 | Kondo et al. | 52/782.1 |
| 2005/0037147 A1* | 2/2005 | Ogunwumi et al. | 427/393.6 |
| 2006/0193756 A1 | 8/2006 | Suzuki et al. | 422/177 |
| 2007/0224093 A1 | 9/2007 | Miyairi et al. | 422/180 |
| 2008/0032091 A1 | 2/2008 | Beall et al. | 428/116 |
| 2008/0047243 A1* | 2/2008 | Beall et al. | 55/523 |
| 2008/0107806 A1 | 5/2008 | Mergner et al. | 427/185 |
| 2008/0264010 A1 | 10/2008 | Mizuno et al. | 55/350.1 |
| 2008/0317999 A1 | 12/2008 | Patchett et al. | 428/116 |
| 2009/0062105 A1 | 3/2009 | Custer et al. | 501/80 |
| 2009/0087613 A1 | 4/2009 | Lu et al. | 428/117 |
| 2009/0233789 A1 | 9/2009 | Gadkaree et al. | 502/181 |
| 2010/0129599 A1 | 5/2010 | Lu et al. | 428/116 |
| 2010/0129600 A1 | 5/2010 | Lu et al. | 428/116 |
| 2010/0142769 A1 | 6/2010 | Hirota | 382/118 |

* cited by examiner

*Primary Examiner* — Tom Duong
(74) *Attorney, Agent, or Firm* — Charles A. Greene

(57) ABSTRACT

A porous ceramic honeycomb article comprising a honeycomb body formed from cordierite ceramic, wherein the honeycomb body has a porosity P %≥55% and a cell channel density CD≥150 cpsi. The porous channel walls have a wall thickness T, wherein $(11+(300-CD)*0.03) \geq T \geq (8+(300-CD)*0.02)$, a median pore size ≤20 microns, and a pore size distribution with a d-factor of ≤0.35. The honeycomb body has a specific pore volume of VP≤0.22. The porous ceramic honeycomb article exhibits a coated pressure drop increase of ≤8 kPa at a flow rate of 26.5 cubic feet per minute when coated with 100 g/L of a washcoat catalyst and loaded with 5 g/L of soot.

6 Claims, 7 Drawing Sheets

POROUS CERAMIC HONEYCOMB ARTICLES AND METHODS FOR MAKING THE SAME

CROSS-REFERENCE TO RELATED APPLICATIONS

This application is a divisional of and claims the benefit of priority to U.S. application Ser. No. 12/955,268 filed on Nov. 29, 2010, which is hereby incorporated by reference for all purposes as if fully set forth herein.

FIELD

The present specification generally relates to porous ceramic honeycomb articles and, more specifically, to cordierite porous ceramic honeycomb articles for use as filter materials.

TECHNICAL BACKGROUND

Ceramic honeycomb articles are widely used as anti-pollution devices in the exhaust systems of automotive vehicles, both as catalytic converter substrates in automobiles, and as particulate filters in diesel-powered vehicles. Ceramic honeycomb articles for use in such applications are formed from a matrix of thin, porous ceramic walls which define a plurality of parallel, gas conducting channels. In ceramic honeycomb articles used as catalytic substrates in automobiles with gasoline engines, the gas conducting channels are open at both ends. A catalytic coating is applied to the outer surfaces of the walls. Exhaust gasses flowing through the channels come into contact with catalytic coatings on the surfaces of the walls. These honeycomb articles are referred to as flow-through substrates. In diesel systems, exhaust gasses also come into contact with catalytic coatings on the surfaces of the walls. In diesel applications, the ceramic honeycomb articles may also have end-plugs in alternate gas conducting channels to force exhaust gasses to pass through the porous channel walls in order to capture and filter out soot and ash particulates prior to exhaust discharge. These ceramic honeycomb substrates are referred to as ceramic wall-flow particulate filters and, more specifically, as diesel particulate filters.

Application of the catalyst washcoat to the honeycomb substrate alters the properties of the honeycomb structure as the washcoat is deposited on the walls and within the pores of the honeycomb substrate. This results in an increase of back-pressure for exhaust gasses flowing through the honeycomb. Furthermore, the extreme temperature fluctuations experienced by honeycomb articles used in both automotive and diesel applications makes the ceramic honeycomb articles susceptible to temperature-induced cracking which leads to the degradation of the honeycomb articles.

Accordingly, a need exists for alternative porous ceramic honeycomb structures with decreased back pressure gain after coating with a catalyst washcoat.

SUMMARY

According to one embodiment, a porous ceramic honeycomb article includes a honeycomb body formed from cordierite ceramic and comprising a plurality of cell channels formed by porous channel walls. The honeycomb body has a porosity P %≥55%, a cell channel density CD≥150 cpsi, and a wall thickness T, wherein $(11+(300-CD)*0.03) \geq T \geq (8+(300-CD)*0.02)$, wherein the wall thickness T is in units of mils. The porous channel walls of the honeycomb body have a median pore size ≤20 microns. The porous channel walls of the honeycomb body have a pore size distribution with a d-factor of ≤0.35, wherein the d-factor=$(d_{50}-d_{10})/d_{50}$. The honeycomb body has a specific pore volume per volume of the honeycomb body of VP≤0.22, wherein VP=(1−OFA)*P %, wherein OFA is an open frontal area of the porous honeycomb body. The porous ceramic honeycomb article exhibits a coated pressure drop increase of ≤8 kPa at a flow rate of 26.5 cubic feet per minute when coated with 100 g/L of a washcoat catalyst and loaded with 5 g/L of soot.

In another embodiment, a method for making a porous ceramic honeycomb article includes mixing a batch of inorganic components with an organic pore former and at least one processing aid to form a plasticized batch. The batch of inorganic components has a median inorganic particle size $d_{50IP} \leq 15$ microns and comprise talc having $d_{pt50} \leq 10$ µm, a silica-forming source having $d_{ps50} \leq 20$ µm, and an alumina-forming source having a median particle diameter $d_{pa50} \leq 10.0$ µm, wherein $d_{ps50}$ is a median particle diameter of the silica-forming source, $d_{pa50}$ is a median particle diameter of the alumina-forming source and $d_{pa50}$ is a median particle diameter of the talc. The organic pore former is present in the plasticized batch in an amount greater than about 35 wt. %, the organic pore former having $d_{pp50} \leq 25$ nm, wherein $d_{pp50}$ is a median particle diameter of the organic pore former. The plasticized batch is formed into a green honeycomb article and the organic pore former is burned out of the green honeycomb article. The green honeycomb article is fired under conditions effective to form the porous ceramic honeycomb article having: a cordierite crystal phase having a microcrack parameter ($Nb^3$) of from about 0.04 to about 0.25; a porosity P %≥55%; a median pore size ≤20 microns; a wall thickness T, wherein $(11+(300-CD)*0.03) \geq T \geq (8+(300-CD)*0.02)$, wherein the wall thickness T is in units of mils; and a pore size distribution with a d-factor of ≤0.35, wherein the d-factor= (d50−d10)/d50. Subsequent to firing, the porous ceramic honeycomb article is exposed to a microcracking condition, wherein after exposure to the microcracking condition, the porous ceramic honeycomb article comprises a microcrack parameter ($Nb^3$) is at least 20% greater than the microcrack parameter prior to exposure to the microcracking condition.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
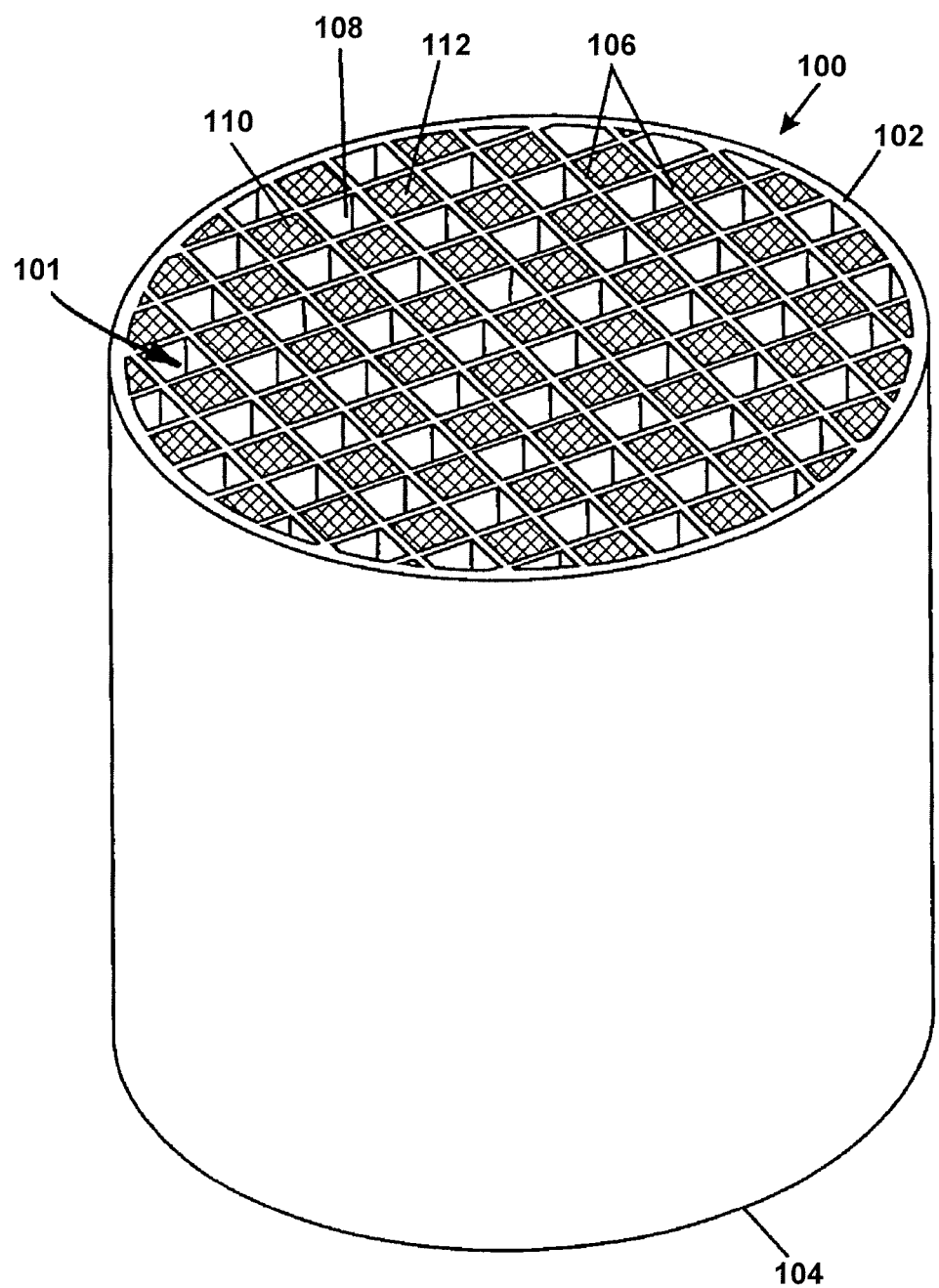
FIG. 1 schematically depicts a porous ceramic honeycomb article according to one or more embodiments shown and described herein.

Reference will now be made in detail to embodiments of porous ceramic honeycomb articles, examples of which are illustrated in the accompanying drawings. Whenever possible, the same reference numerals will be used throughout the drawings to refer to the same or like parts. One embodiment of a porous ceramic honeycomb article is schematically depicted in FIG. 1. The porous ceramic honeycomb article includes a honeycomb body formed from cordierite ceramic and comprising a plurality of cell channels formed by porous channel walls. The channel walls of the honeycomb body have a porosity P %≥55%, a median pore size ≤20 microns, and a cell channel density CD≥150 cpsi. The porous channel walls of the honeycomb body have a wall thickness T, wherein $(11+(300-CD)*0.03) \geq T \geq (8+(300-CD)*0.02)$, where the wall thickness T is in units of mils. The honeycomb body also has a specific pore volume ≤0.22 which represents the ratio of the total volume of the pores present in the porous channel walls to the total volume of the honeycomb. The porous channel walls of the honeycomb body have a pore size distribution with a d-factor of ≤0.35, wherein the d-factor= $(d_{50}-d_{10})/d_{50}$. The ratio of the surface porosity to the total bulk porosity is greater than or equal to 0.5. The porous ceramic honeycomb article has a coated pressure drop increase of ≤8 kPa at a flow rate of 26.5 cubic feet per minute when coated with 100 g/L of a washcoat catalyst and loaded with 5 g/L of soot. The porous ceramic honeycomb articles and methods for making the porous ceramic honeycomb articles will be described in more detail herein.

As used herein, the singular forms "a," "an" and "the" include plural referents unless the context clearly dictates otherwise. Thus, for example, reference to a "silica-forming source" or an "alumina-forming source" may include aspects of having two or more such forming sources, unless the context clearly indicates otherwise.

As used herein, a "wt. %" or "weight percent" or "percent by weight" of an organic component, unless specifically stated to the contrary, is based on the total weight of the total inorganics in which the component is included. All organic additions, such as, for example, pore formers and binders, are specified herein as superadditions based upon 100% of the inorganics used.

Referring now to FIG. 1, a porous ceramic honeycomb article 100 is schematically depicted. The porous ceramic honeycomb article 100 may be used as a wall-flow filter for particulate matter filtration. For example, the porous ceramic honeycomb article 100 may be used in filtering particulate matter from a vehicle exhaust. The porous ceramic honeycomb article 100 generally comprises a porous cordierite ceramic honeycomb body having a plurality of cell channels 101 extending between a first end 102 and a second end 104. The plurality of generally parallel cell channels 101 formed by, and at least partially defined by, intersecting porous channel walls 106 that extend from the first end 102 to the second end 104. The porous ceramic honeycomb article 100 may also include a skin formed about and surrounding the plurality of cell channels. This skin may be extruded during the formation of the channel walls 106 or formed in later processing as an after-applied skin, by applying a skinning cement to the outer peripheral portion of the cells.

In one embodiment, the plurality of parallel cell channels 101 are generally square in cross section and are formed into a honeycomb structure. However, in alternative embodiments, the plurality of parallel cell channels in the honeycomb structure may have other cross-sectional configurations, including rectangular, round, oblong, triangular, octagonal, hexagonal, or combinations thereof.

The term "honeycomb" as used herein is defined as a structure of longitudinally-extending cells formed from the channel walls 106 and preferably having a generally repeating grid pattern therein. For honeycombs utilized in filter applications, certain cells are designated as inlet cells 108 and certain other cells are designated as outlet cells 110. Moreover, in a porous ceramic honeycomb article 100, at least some of the cells may be plugged with plugs 112. Generally, the plugs 112 are arranged at or near the ends of the cell channels and are arranged in some defined pattern, such as in the checkerboard pattern shown in FIG. 1, with every other cell being plugged at an end. The inlet channels 108 may be plugged at or near the second end 104, and the outlet channels 110 may be plugged at or near the first end 102 on channels not corresponding to the inlet channels. Accordingly, each cell may be plugged at or near one end of the porous ceramic honeycomb article only.

Figure 2:
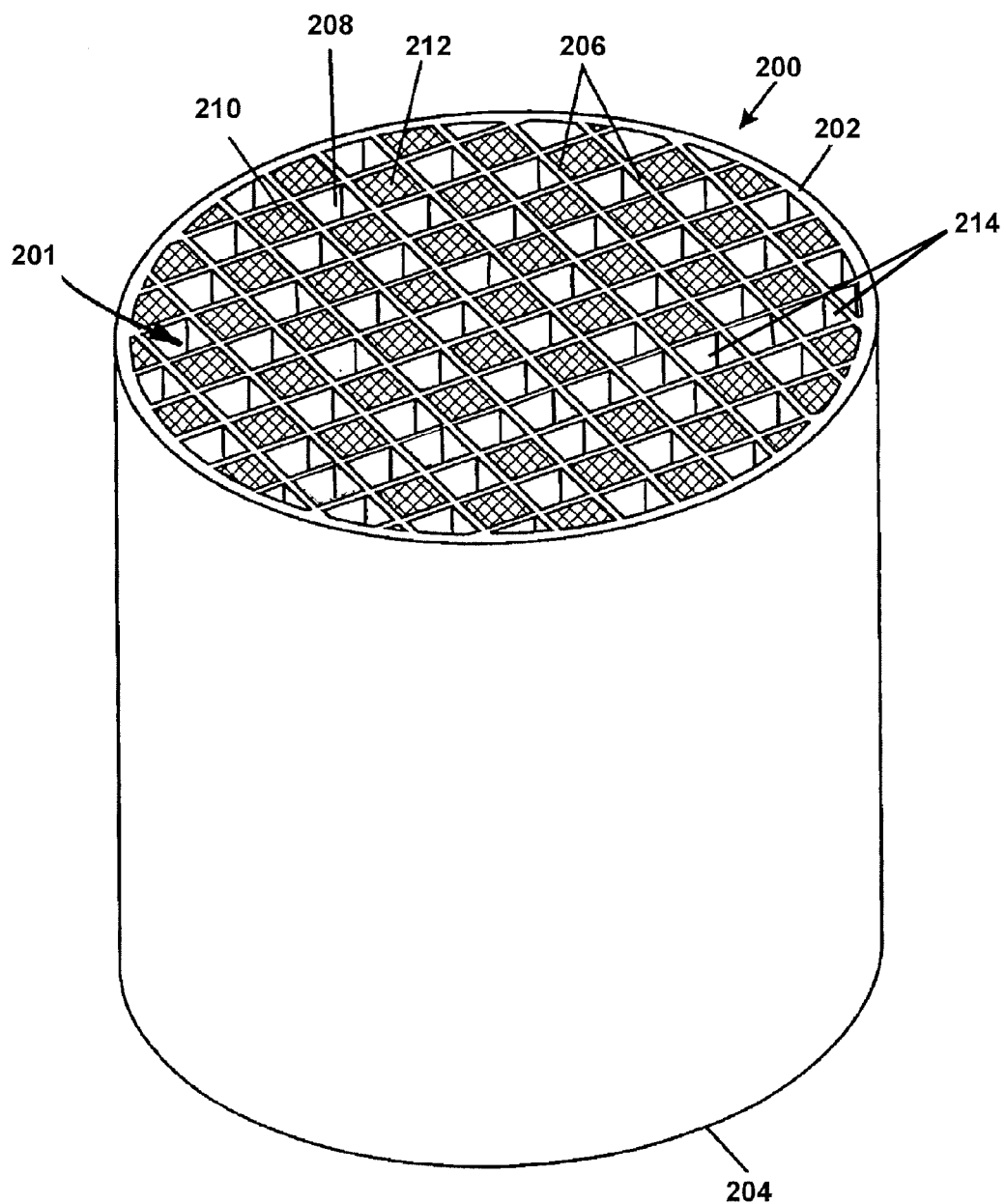
FIG. 2 schematically depicts a porous ceramic honeycomb article according to one or more embodiments shown and described herein.

Referring now to FIG. 2, an alternative embodiment of a porous ceramic honeycomb article 200 is schematically depicted. In this embodiment, some cell channels may be flow-through channels (unplugged along their entire length) while other channels may be plugged thus providing a so-called "partial filter" design. More specifically, the porous ceramic honeycomb article depicted in FIG. 2 generally comprises intersecting porous walls 206, inlet cells 208 plugged with plugs (not shown) at the outlet end 204, outlet cells 210 plugged with plugs 212 at the inlet end and at least some flow through (unplugged) channels 214 where flow passes directly through the body of the porous ceramic honeycomb article without passing through the porous channel walls 206. For example, in one embodiment (not shown), every other cell in every other row is a flow through channel. Thus, in this embodiment, less than 50% of the channels may be unplugged.

While FIGS. 1 and 2 depict embodiments of porous ceramic honeycomb articles 100, 200 in which some or all of the channels are plugged, is should be understood that, in alternative embodiments, all the channels of the porous ceramic honeycomb articles may be unplugged, such as when the porous ceramic honeycomb articles 100, 200 are used as catalytic through-flow substrates for use with gasoline engines.

In one embodiment of the porous ceramic honeycomb articles 100, 200 described herein, the thickness T of the porous channel walls 106, 206 in units of mils (1/1000 inch or 25.4 microns) is a function of the cell density of the honeycomb article 100, 200 in cpsi. Specifically, the thickness T of the porous channel walls may be in a range from about (11+(300−CD)*0.03) to about (8+(300−CD)*0.02), where CD is the density of the cells in cells per square inch (cpsi). In other embodiments, the thickness of the channel walls is in a range from about (10+(300−CD)*0.03) to about (6+(300−CD)*0.02). In other embodiments, the thickness of the channel walls is in range from about (12+(300−CD)*0.03) to about (8+(300−CD)*0.02).

The cell density CD of the porous ceramic honeycomb articles 100, 200 may be less than or equal to about 400 cells/in$^2$. In another embodiment, the cellular density of the porous ceramic honeycomb articles 100, 200 may be less than or equal to about 300 cells/in$^2$. In yet another embodiment, the cellular density of the porous ceramic honeycomb articles 100, 200 may be greater than or equal to about 150 cells/in$^2$. Accordingly, in the embodiments described herein, it should be understood that the cellular density of the porous ceramic honeycomb articles 100, 200 may be greater than or equal to about 150 cells/in$^2$ and less than or equal to about 400 cells/in$^2$.

Reference may be made herein to the porous ceramic honeycomb article having "geometry" of A/B where A is the cellular density of the porous ceramic honeycomb article and B is the thickness of the channel walls. By way of example and not limitation, a porous ceramic honeycomb article having a 200/10 geometry has a cellular density of 200 cells/in$^2$ and a cell wall thickness of 10 mils. In some embodiments described herein, the porous ceramic articles have a geometry of 300/8. In other embodiments, the porous ceramic articles have a geometry of 300/10. In still other embodiments the porous ceramic articles have a geometry of 200/12. However, it should be understood that other geometries are possible.

The porous ceramic honeycomb articles described herein generally have a relatively high total porosity (% P). In the embodiments of the porous ceramic honeycomb articles described herein, the total porosity % P is greater than or equal to about 50% and less than or equal to about 70% as measured with mercury porosimetry. In some embodiments, the total porosity % P is greater than or equal to about 55% and less than or equal to about 65%. In other embodiments, the total porosity % P is greater than or equal to about 58% and less than or equal to 62%. In yet other embodiments the total porosity % P is greater than or equal to about 62% and less than or equal to 65%.

Figure 3:
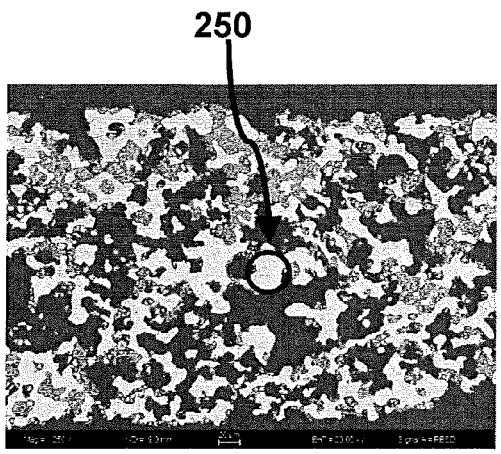
FIG. 3 is an SEM micrograph of a polished cross section of a porous cell channel wall of a porous ceramic honeycomb article coated with a catalyst washcoat according to one or more embodiments shown and described herein.
Figure 4:
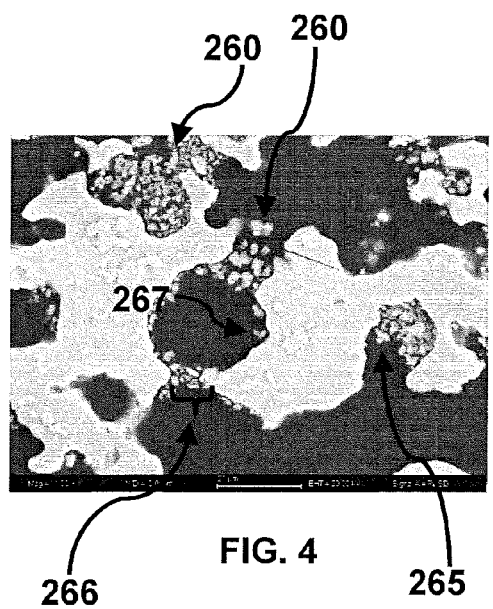
FIG. 4 is an SEM micrograph of a portion of the porous cell channel wall of FIG. 3.
Figure 5:
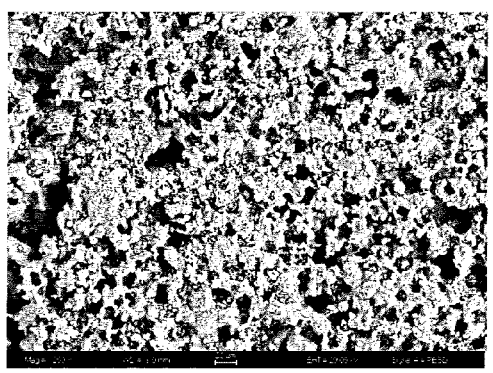
FIG. 5 is an SEM micrograph of a surface of a porous cell channel wall of a porous ceramic honeycomb article coated with a catalyst washcoat according to one or more embodiments shown and described herein.
Figure 6:
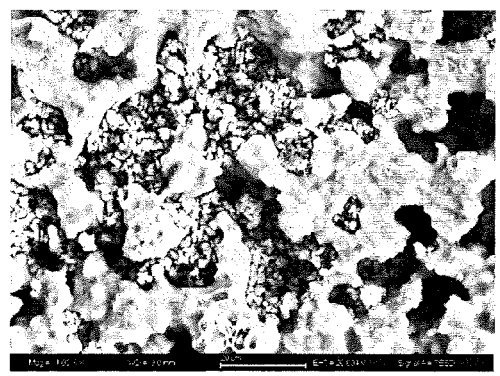
FIG. 6 is an SEM micrograph of a portion of the porous cell channel wall of FIG. 5.

Referring to FIGS. 3-6, the pores of the porous ceramic honeycomb article are highly connected within the channel-like domains of cordierite ceramic indicating an interpenetrated network structure. Specifically FIGS. 3 and 4, depict SEM micrographs of the pore morphology of a polished axial cross section of a cell channel wall coated with a catalyst washcoat. FIGS. 5 and 6 depict the surface pore morphology of a porous ceramic honeycomb article coated with a catalyst washcoat. As shown in FIGS. 3 and 4, the pores of the porous ceramic honeycomb are generally well connected into channels. The surface pore morphology depicted in FIGS. 5 and 6 is generally similar to the pore morphology of the axial cross section shown in FIGS. 3 and 4. Accordingly, the morphology of the surface porosity taken in conjunction with the morphology of the total body porosity is generally a bi-continuous morphology. In the embodiments described herein the cordierite domain size is generally greater than or equal to about 20 microns or even 40 microns. In some embodiments the cordierite domain size is greater than 60 microns. In other embodiments, the cordierite domain size within the porous ceramic honeycomb article is in the range from about 20 microns to about 80 microns.

The specific pore volume of the honeycomb article characterizes the total volume available inside the porous structure of the channels walls as a function of the porosity % P of the of the porous ceramic honeycomb article and the total volume of the channel walls present in the porous ceramic article, referred to herein as the open frontal area (OFA) of the porous honeycomb article. More specifically, the specific pore volume VP is related to the OFA and the porosity % P according to the relation:

$$VP = (1-OFA)*(\% P)$$

The porous ceramic honeycomb articles described herein generally have a relatively low specific pore volume VP. In the embodiments described herein, the porous ceramic honeycomb articles have a specific pore volume less than 0.22. In some embodiments, the specific pore volume may be less than 0.2 or even less than 0.185. In yet another embodiment, the specific pore volume may be less than 0.18. In some other embodiments, the specific pore volume may be in the range of $0.21 \leq VP \leq 0.14$.

The bare surface porosity of the porous ceramic honeycomb articles, as measured by image analysis of SEM micrographs of the porous ceramic honeycomb articles prior to washcoating, is generally ≥30% or even ≥35%. In some embodiments, the surface porosity of the porous ceramic honeycomb articles is ≥38% or even ≥40%. In other embodiments, the surface porosity is ≥42%. The higher surface porosity yields a porous ceramic honeycomb article with a higher permeability and a corresponding lower backpressure drop when used as a particulate filter in automotive and/or diesel applications. Based on the surface porosity and the total porosity, embodiments of the porous ceramic honeycomb articles have a surface porosity to total porosity ratio of greater than or equal to 0.5 or even greater than equal to 0.6. In some embodiments the surface porosity to total porosity ratio is greater than or equal to 0.7.

The porous ceramic honeycomb articles described herein generally have a median pore diameter $d_{50}$ in the range from about 12 microns to about 20 microns. In some embodiments, the median pore diameter $d_{50}$ of the porous ceramic honeycomb article is less than or equal to about 20 microns or even less than or equal to about 16 microns. In other embodiments, the median pore diameter $d_{50}$ of the fired porous ceramic honeycomb article is in the range from about 12 microns to about 14 microns. Controlling the porosity such that the median pore diameter $d_{50}$ is within these ranges limits the amount of very small pores and thereby minimizes the washcoated backpressure of the fired porous ceramic article.

In the embodiments described herein, the pore size distribution of the porous ceramic honeycomb article comprises a $d_{10}$ value of greater than or equal to 5 microns or even greater than or equal to 8 microns. The quantity $d_{10}$, as used herein, is the pore diameter at which 10% of the pore volume is comprised of pores with diameters smaller than the value of $d_{10}$; thus, using mercury porosimetry techniques to measure porosity, $d_{10}$ is equal to the pore diameter at which 90% by volume of the open porosity of the ceramic has been intruded by mercury during the porosimetry measurement.

As used herein, the d-factor $d_f$ is a characterization of the relative width of the distribution of pore sizes that are finer than the median pore size $d_{50}$. The d-factor $d_f$ is defined as:

$$d_f = (d_{50} - d_{10})/d_{50},$$

where $d_{50}$ and $d_{10}$ are as defined hereinabove. In the embodiments described herein, the pore size distribution of the open interconnected porosity of the porous walls of the porous ceramic honeycomb article is relatively narrow such that $d_f \leq 0.35$, $d_f \leq 0.3$, $d_f \leq 0.25$, $d_f \leq 0.22$, or even $d_f \leq 0.2$. In some embodiments, the d-factor of the porous ceramic honeycomb articles is in a range from about 0.15 to about 0.35.

In the embodiments described herein, the porous ceramic honeycomb article has a pore size distribution with a $d_{90}$ value of less than or equal to 45 microns or even less than or equal to 35 microns. Some embodiments of the porous ceramic honeycomb articles have a pore size distribution with a $d_{90}$ value of less than or equal to 30 microns. The quantity $d_{90}$, as used herein, is the pore diameter at which 90% of the pore volume is comprised of pores with diameters smaller than the value of $d_{90}$; thus, using mercury porosimetry techniques to measure porosity, $d_{90}$ is equal to the pore diameter at which 10% by volume of the open porosity of the ceramic has been intruded by mercury during the porosimetry measurement.

The ultra narrow pore size distribution of the porous ceramic honeycomb articles may also be characterized by the breadth $d_{Absb}$ of the distribution of pore sizes that are both finer and coarser than the median pore size $d_{50}$. As used herein, $d_{Absb}$ is defined as:

$$d_{Absb} = (d_{75} - d_{25}),$$

where the quantity $d_{25}$, as used herein, is the pore diameter at which 25% of the pore volume is comprised of pores with diameters smaller than the value of $d_{25}$ and the quantity $d_{75}$, as used herein, is the pore diameter at which 75% of the pore volume is comprised of pores with diameters smaller than the value of $d_{75}$. The porous ceramic honeycomb articles described herein may have a pore size distribution exhibiting a $d_{Absb} \leq 10$ microns. In some embodiments, the porous ceramic honeycomb articles exhibit a $d_{Absb} \leq 8$ microns or even a $d_{Absb} \leq 6$ microns. Having a narrow breadth around the median pore size value ensures that the majority of the pores and pore space/pore volume are within a desired range and that little volume of the porous ceramic honeycomb article is lost to pores that are either too small or too large. It is believed that this narrow absolute breadth is expected to provide improved catalyst washcoat coatability as well as high permeability following coating with a catalyst washcoat (i.e., high efficiency in pore utilization for flow).

In the embodiments described herein, the combined properties of the total porosity, the surface porosity, the median pore diameter $d_{50}$, the d-factor $d_f$, and the specific pore volume provide a porous ceramic honeycomb article with a relatively high initial filtration efficiency in both the bare and coated conditions. In some embodiments, the bare initial filtration efficiency is greater than or equal to 50% or even greater than or equal to 55%. In other embodiments of the porous ceramic honeycomb articles described herein, the bare initial filtration efficiency is greater than or equal to 60% or even greater than 70%. In still other embodiments the bare initial filtration efficiency is greater than or equal to 90%. Similarly, in some embodiments, the coated initial filtration efficiency is greater than or equal to 50% or even greater than or equal to 55% after coating with a catalyst washcoat. In some embodiments of the porous ceramic honeycomb articles described herein, the coated initial filtration efficiency is greater than or equal to 60% or even greater than 70%. In other embodiments the coated initial filtration efficiency is greater than or equal to 90%.

Figure 13:
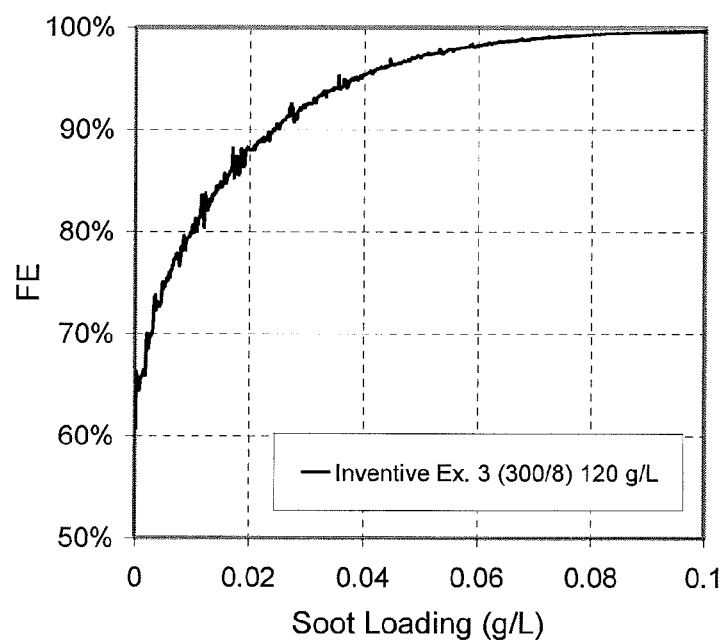
FIG. 13 is a plot of filtration efficiency (y-axis) as a function of soot loading (x-axis) for an Inventive Example of a porous ceramic honeycomb article coated with catalyst washcoat.

Referring to FIG. 13 by way of example, a plot of the coated initial filtration efficiency (FE) (y-axis) as a function of the soot loading (x-axis) is graphically depicted for one Inventive Example of a porous ceramic honeycomb article. The Inventive Example had a 300/9 cell geometry, a porosity of 60%, a d-factor of 0.26, a median pore diameter of 19.3 microns, and a specific pore volume of 0.144. The sample was coated with 120 g/L of catalyst washcoat of 12 wt. % of Fe-ZSM-5 zeolite (3 micron particle size) in water. As shown in FIG. 13, the initial filtration efficiency ($FE_0$) of the porous ceramic honeycomb article (i.e., the filtration efficiency at a soot loading of 0 g/L) was greater than about 65%.

Further, it has now been found that the combination of the total porosity, the surface porosity, the median pore diameter $d_{50}$, the d-factor $d_f$, and the specific pore volume described herein generally provide a porous ceramic honeycomb article which can be readily coated with a significant amount of catalyst washcoat in a single washcoating step, thus exhibiting a unique accessibility of the pore space provided within the porous ceramic honeycomb. In the embodiments described herein, the catalyst washcoat is generally present in the porous ceramic honeycomb article in an amount greater than about 30 g/L. In some embodiments described herein, the porous ceramic honeycomb articles have a single-coat catalyst washcoat loading $\geq 50$ g/L or even greater than 60 g/L for a washcoat slurry containing 12 wt. % of Fe-ZSM-5 zeolite in water with a peak particle size of 3.3 microns. For some embodiments, it is contemplated that the single-coat catalyst washcoat loading may be $\geq 60$ g/L.

In the embodiments described herein the porous ceramic articles exhibit a coated pressure drop increase $\leq 8$ kPa at a flow rate of 26.5 cubic feet per minute when coated with 100 g/L of the washcoat catalyst and loaded with 5 g/L of soot. In some embodiments the coated pressure drop increase is $\leq 7$ kPa, or even $\leq 6.5$ kPa under the same conditions. In other embodiments, the coated pressure drop increase is $\leq 6$ kPa, or even $\leq 5.5$ kPa under the same conditions. In still other embodiments the coated pressure drop increase is $\leq 5$ kPa under the same conditions.

In the embodiments described herein the porous ceramic articles exhibit a bare pressure drop increase $\leq 4$ kPa at a flow rate of 26.5 cubic feet per minute when loaded with 5 g/L of soot. In some embodiments the coated pressure drop increase is $\leq 3.5$ kPa, or even $\leq 3.0$ kPa under the same conditions. In other embodiments, the coated pressure drop increase is $\leq 2.5$ kPa, or even $\leq 2.0$ kPa under the same conditions. In still other embodiments the coated pressure drop increase is $\leq 1.5$ kPa under the same conditions.

Figure 7:
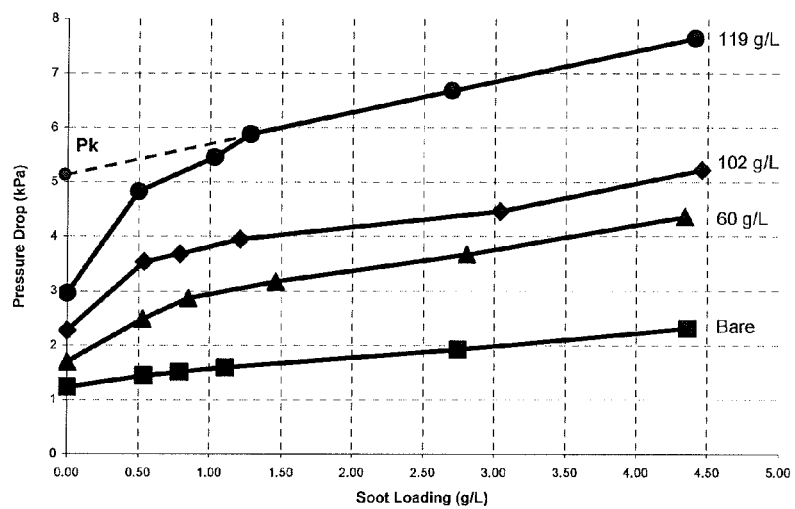
FIG. 7 is a plot of pressure drop (y-axis) as a function of soot loading (x-axis) for bare porous ceramic honeycomb article and porous ceramic honeycomb articles coated with different amounts of a catalyst washcoat.

Referring, now to FIG. 7, a plot of the pressure drop (y-axis) as a function of soot loading is graphically depicted for a bare (i.e., uncoated) porous ceramic article as well as for porous ceramic articles loaded with different amounts of a catalyst washcoat, specifically 60 g/L, 102 g/L and 119 g/L. Each porous ceramic article had a 300/8 cell geometry (i.e., 300 cpsi and a wall thickness of 8 mils), a median pore size of 11.7 microns, a porosity of 62% prior to washcoating, and a d-factor $d_f$ of 0.25. The porous ceramic honeycombs used in the experiments had a diameter of 2" and a length of 6". The soot was Printex U loaded at a rate of 0.1 g/min to 0.3 g/min at a gas flow rate of 10-30 standard cubic feet per minute at room temperature. The curves were obtained at a flow rate of 26.5 cubic feet per minute. Table 1 contains the pressure values in kPa for the clean back pressure (i.e., the back pressure with no soot loading), the 5 g/L soot loaded back pressure (i.e., the back pressure when the porous ceramic article is loaded with 5 g of soot per liter of the porous ceramic honeycomb), and the knee height for each of the porous ceramic articles. The knee height, as used herein, is defined as the pressure drop at the point Pk which may be determined graphically as shown in FIG. 7.

TABLE 1

| Catalyst loading | Clean back pressure (kPa) | 5 g/L soot loaded back pressure (kPa) | Height of knee (kPa) |
|---|---|---|---|
| Bare | 1.2 | 2.5 | 0.1 |
| 60 g/L | 1.7 | 4.7 | 0.9 |
| 102 g/L | 2.3 | 5.5 | 0.8 |
| 119 g/L | 3.0 | 7.8 | 2.2 |

As graphically depicted in FIG. 7, the bare porous ceramic honeycomb article had a clean back pressure increase of 1.2 kPa while the porous ceramic honeycomb article coated with approximately 100 g/L of catalyst washcoat comprising 12 wt. % of Fe-ZSM-5 zeolite in water had a clean back pressure increase of 2.3 kPa. This value is unexpectedly low considering the low specific pore volume of the porous ceramic honeycomb article (0.16 in the examples) and low median pore size. Accordingly, the porous ceramic honeycomb with catalyst washcoat of 100 g/L had a clean pressure drop increase of approximately 91% after being coated with the 100 g/L of catalyst washcoat.

Similarly, the bare porous ceramic honeycomb article had a 5 g/L soot loaded back pressure increase of 2.5 kPa while the porous ceramic honeycomb article coated with approximately 100 g/L of catalyst washcoat comprising 12 wt. % of Fe-ZSM-5 zeolite in water had a 5 g/L soot loaded back pressure increase of 5.5 kPa. This value is unexpectedly low considering the low specific pore volume of the porous ceramic honeycomb article (0.16 in the examples) and low median pore size. Accordingly, the porous ceramic honeycomb with catalyst washcoat of 100 g/L had a 5 g/L soot loaded pressure drop increase of approximately 120% after being coated with 100 g/L of catalyst washcoat.

Accordingly, it should be understood that, in some embodiments described herein, the porous ceramic honeycomb articles exhibit a clean pressure drop increase of ≤100% after coating with 100 g/L of a washcoat catalyst relative to the porous ceramic article prior to coating under identical test conditions. In some other embodiments, the clean pressure drop increase after coating with 100 g/L of a washcoat catalyst is ≤95% relative to the uncoated porous ceramic article, or even ≤93% relative to the uncoated porous ceramic article.

Further, it should also be understood that, in some embodiments described herein, the porous ceramic honeycomb articles exhibit a 5 g/L soot loaded pressure drop increase of ≤150% after coating with 100 g/L of a washcoat catalyst relative to the porous ceramic article prior to coating under identical test conditions. In some other embodiments, the 5 g/L soot-loaded pressure drop increase after coating with 100 g/L of a washcoat catalyst is ≤140% relative to the uncoated porous ceramic article, or even ≤130% relative to the uncoated porous ceramic article.

Without being bound by theory, it is believed that the high single-coat catalyst washcoat loading and relatively low pressure drop increase in both clean and soot-loaded conditions can be attributed to the selected range of median pore sizes, the narrow pore size distribution, and the high ratio of surface porosity to bulk porosity enabling an optimized utilization of the pore space inside the wall structure as well as cell geometries that allow for low resistance to flow across the filter. For example, a lower resistance to flow in general correlates to porous ceramic honeycomb articles with higher open frontal area, which have been heretofore perceived as having inferior catalyst washcoat loading capacities due to the lower specific pore volume. However, the unique structure of the porous ceramic honeycomb articles described herein compensate for these shortfalls by enabling high utilization of the pore volume to accommodate more catalyst washcoat. As a result, low pressure drop increases can be achieved at high washcoat loadings despite the lower specific pore volume VP of the porous ceramic honeycomb articles. For example, referring to FIGS. 3 and 4, the porous ceramic honeycomb article has a uniform channel-like domain 250 (i.e., the lighter portions of the micrograph) where all the catalyst washcoat is coated into the pores rather than on the walls of the channels. More specifically, the zeolite particles 260 in the catalyst washcoat preferentially coat the small pores 265, and portions of the domain with small radii of curvature as well as neck areas 266 due to higher micro-capillary forces in these areas as the catalyst washcoat is dried in the porous ceramic article. By comparison, portions with relatively larger radii of curvature, such as relatively larger pores 267 and/or flat areas of the domain structure, have much less catalyst after drying due to the effective lowering of the boiling point of the washcoat as a result of relatively lower micro-capillary forces. As a consequence, the catalyst washcoat with the zeolite preferentially flows in to the smaller pores which, in turn, are dried last (i.e., after the larger pores) thereby yielding a higher concentration of catalyst in the smaller pores.

Further, the high density of uniformly distributed and well connected pores allows for a greater amount of zeolite to be washcoated into the porous ceramic article while still maintaining the permeability of the porous ceramic article to gas, such as exhaust gases, which flow through the porous ceramic article. Similarly, because the porous ceramic article has a narrow pore size distribution with a relatively small median pore size, the pores have a high microcapillary force which assists in retaining the zeolite in the pores. Accordingly, the zeolite deposited in the pores during washcoating with the catalyst washcoat is not easily dislodged from the pores during high-volume flow of gas through the porous ceramic article compared to porous ceramic articles having larger median pore sizes and broader pore size distributions.

In addition, the porous ceramic honeycomb articles described herein have a set of physical properties (i.e., coefficient of thermal expansion (CTE), thermal shock limit (TSL), microcrack parameter ($Nb^3$), etc.) which change when the porous ceramic honeycomb articles are exposed to a microcracking condition thereby producing a porous ceramic honeycomb article which has an improved resistance to thermal shock. More specifically, it has been found that the porous ceramic honeycomb articles described herein have a relatively high CTE over the temperature range from about 25° C. to 800° C. and a corresponding low thermal shock limit (TSL) after firing. However, following exposure to a microcracking condition, the porous ceramic cordierite honeycomb articles described herein have a relatively lower CTE over the temperature range from about 25° C. to 800° C. and a relatively higher thermal shock limit (TSL). It should be understood that CTE, as used herein, is the coefficient of thermal expansion in at least one direction of the article over the specified temperature range, unless otherwise specified. The improvement in the CTE and TSL following exposure to the microcracking condition is due to the increase in the volume of microcracks following exposure to the microcracking condition as indicated by an increase in the microcrack parameter $Nb^3$ after exposure to the microcracking condition. More specifically, the microcrack parameter $Nb^3$ of the porous ceramic honeycomb articles increases by at least 20 percent after the article is exposed to a microcracking condition.

The microcrack parameter $Nb^3$ is derived from the modulus of elasticity ($E_{mod}$) heating and cooling curve between room temperature and 1200° C. and is an indirect measure of the microcrack volume of the article. $Nb^3$ is calculated as:

$$Nb^3 = \frac{\left[\frac{E_0}{E} - 1\right]}{1.8},$$

where E is the elastic modulus of the article at room temperature with microcracks (i.e., after exposure to a microcracking condition), $E_0$ is the elastic modulus of the article at room temperature without microcracks (i.e., before exposure to a microcracking condition), N is the number of microcracks and b is the average length of a microcrack. The microcrack parameter $Nb^3$ is measured in units of volume given that the average crack length b, is cubed.

Thermal Shock Limit (TSL), as used herein, is defined as:

TSL=TSP+500° C., where TSP is the Thermal Shock Parameter such that:

TSP=MOR/$\{[E_{mod}][CTE_H]\}$ and $E_{mod}$ is the elastic modulus of the article at 25° C. (i.e., room temperature (RT)), MOR is the modulus of rupture strength at room temperature and is measured in psi, and $CTE_H$ is the high temperature thermal expansion coefficient measured between 500° C. and 900° C. As the TSP increases, the ability of the article to withstand thermal gradients also increases. MOR, $E_{mod}$, and $CTE_H$ are all measured on a cellular specimen parallel to the length of the channels which is referred to herein as the axial direction. MOR was measured using the four point bend method in the axial direction of a rectangular cellular bar having dimensions of 4×1×0.5 inches.

Figure 8:
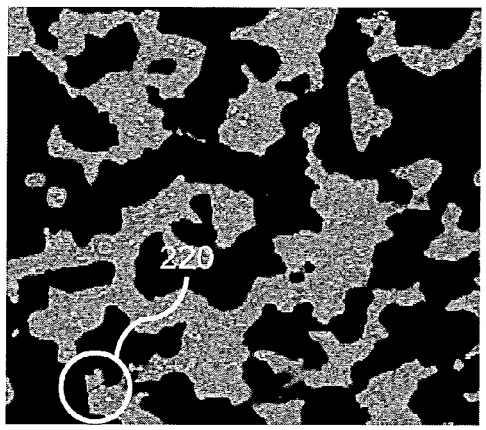
FIG. 8. is an SEM micrograph of a porous ceramic honeycomb article prior to exposure to a microcracking condition according to one or more embodiments shown and described herein.

Referring to FIG. 8, the porous ceramic honeycomb article has a relatively low amount of microcracking prior to exposure to the microcracking condition. Specifically, the SEM micrograph of FIG. 8 depicts a portion of a low-microcracked porous ceramic honeycomb article with very few microcracks 220 (one indicated in FIG. 8). Accordingly, prior to exposure to the microcracking condition, the porous ceramic honeycomb article may be alternatively referred to as a low-microcracked (LMC) porous ceramic honeycomb article. In the embodiments described herein, the LMC porous ceramic honeycomb articles have a microcrack parameter $Nb^3$ from about 0.04 to about 0.25 after firing and prior to exposure to a microcracking condition. Low microcrack parameters in the range of 0.04 to about 0.25 generally correspond to a porous ceramic honeycomb article with very few microcracks 220, as depicted in FIG. 8. In some embodiments, the LMC porous ceramic honeycomb articles have a CTE measured between room temperature and 800° C. from about $7.0 \times 10^{-7}$/° C. to about $15 \times 10^{-7}$/° C. or even from about $8.0 \times 10^{-7}$/° C. to about $13 \times 10^{-7}$/° C. In other embodiments, the LMC porous ceramic honeycomb articles have a CTE from about $9.0 \times 10^{-7}$/° C. to about $12 \times 10^{-7}$/° C. Due to the relatively low microcrack parameter $Nb^3$, LMC porous ceramic honeycomb articles have a Thermal Shock Limits (TSL) which, in the embodiments of the LMC porous ceramic honeycomb articles described herein, is in the range from about 800° C. to about 1100° C. In the embodiments described herein, the LMC porous ceramic honeycomb articles have a modulus of rupture (MOR) of greater than 300 psi or even greater than 400 psi at room temperature. For example, the MOR of a porous ceramic honeycomb article with a 300/8 cell geometry and a median pore size of 11.7 microns, a porosity of 62% prior to washcoating, and a d-factor df of 0.25 is approximately 450 psi at room temperature. In some embodiments, the MOR of the LMC porous ceramic honeycomb articles is greater than about 500 psi.

LMC porous ceramic honeycomb articles made having a 200/10 geometry generally have a modulus of elasticity ($E_{mod}$) at room temperature of greater than or equal to $3.0 \times 10^5$ psi or even greater than $4.5 \times 10^5$ psi. In some embodiments, the modulus of elasticity of the LMC porous ceramic honeycomb articles is in the range from about $3.0 \times 10^5$ psi to about $5.5 \times 10^5$ psi. Based on the MOR and $E_{mod}$, embodiments of the LMC porous ceramic honeycomb articles have a strain tolerance (i.e., MOR/$E_{mod}$) of at least 700 ppm. Other embodiments have a strain tolerance of greater than or equal to 800 ppm, or even greater than 1000 ppm. In yet other embodiments the LMC porous ceramic honeycomb articles have strain tolerance greater than or equal to 1200 ppm.

Figure 9:
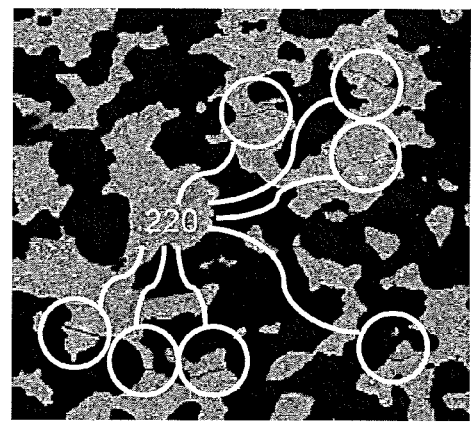
FIG. 9 is an SEM micrograph of a porous ceramic honeycomb article after exposure to a microcracking condition according to one or more embodiments shown and described herein.

Referring to FIG. 9, the microcrack parameter of the substrate may be increased by exposing the LMC porous ceramic honeycomb to a microcracking condition. Specifically, FIG. 9 is an SEM micrograph depicting a portion of a microcracked (MC) porous ceramic honeycomb article which is produced by exposing an LMC porous ceramic honeycomb article to a microcracking condition. Following exposure to a microcracking condition, the now-microcracked porous ceramic honeycomb article has a relatively greater number of microcracks 220 (a plurality of which are indicated in FIG. 9) than the LMC porous ceramic honeycomb article (i.e., the number of microcracks 220 in FIG. 9 is greater than the number of microcracks 220 in FIG. 8). In the embodiments described herein, the microcracking condition may include a thermal cycle or an acid wash, as will be described in more detail herein. As a result of being exposed to the microcracking condition, the microcrack parameter $Nb^3$ of the MC porous ceramic honeycomb article is at least 20% higher than the microcrack parameter of the LMC porous ceramic honeycomb article thus indicating that the MC porous ceramic honeycomb articles have more microcracks per unit volume than the LMC porous ceramic honeycomb articles. For example, the microcrack parameter $Nb^3$ of the MC porous ceramic honeycomb articles may be in the range from at least 0.06 to at least 0.3. The increase in the microcracking parameter $Nb^3$ is accompanied by a decrease in the CTE of the article relative to the LMC porous ceramic honeycomb articles. For example, the CTE of the MC porous ceramic honeycomb articles is generally in the range from about $1.0 \times 10^{-7}$/° C. to about $10 \times 10^{-7}$/° C. over the range of from about 25° C. to about 800° C. In some embodiments, the CTE of the MC porous ceramic honeycomb articles is less than or equal to about $7.0 \times 10^{-7}$/° C. over the range of from about 25° C. to about 800° C. or even less than or equal to about $5.0 \times 10^{-7}$/° C. over the range of from about 25° C. to about 800° C. The increase in $Nb^3$ is accompanied by an increase in the TSL of the porous ceramic honeycomb articles. For example, the TSL of the MC porous ceramic honeycomb articles is greater than or equal to 900° C. or even greater than or equal to 1000° C. In some embodiments, the TSL of the MC porous ceramic honeycomb articles is greater than or equal 1100° C.

While exposure to the microcracking condition generally increases the microcrack parameter $Nb^3$ and the TSL of the MC porous ceramic honeycomb articles, the increase in the number of microcracks per unit volume generally decreases the modulus of rupture (MOR) at room temperature as well as the modulus of elasticity at room temperature ($E_{mod}$) compared to the LMC porous ceramic honeycomb articles. Accordingly, in the embodiments described herein, the MOR of the MC porous ceramic honeycomb article is greater than or equal to about 200 psi or even greater than about 300 psi. The $E_{mod}$ of the MC porous ceramic honeycomb article is generally in the range from about $2.8 \times 10^5$ psi to about $4.4 \times 10^5$ psi for a MC porous ceramic honeycomb article having a 200/10 geometry. In some embodiments, the $E_{mod}$ of the MC porous ceramic honeycomb article may be greater than or equal to $2.8 \times 10^5$ psi for a 200/10 geometry.

The porous ceramic honeycomb articles described herein are formed by first mixing a cordierite precursor batch composition, forming the cordierite precursor batch composition into a green honeycomb article, drying the green honeycomb article and firing the green honeycomb article under conditions suitable to initially produce a low microcracked (LMC) porous ceramic honeycomb article. In one embodiment, after the green honeycomb article is fired to produce the LMC porous ceramic honeycomb article, the LMC porous ceramic honeycomb article may be washcoated with a catalyst-containing washcoat prior to being exposed to the microcracking condition. Because the LMC porous ceramic honeycomb article has relatively few microcracks, a separate passivation coating is not needed prior to application of the washcoat.

In one embodiment, the cordierite precursor batch composition comprises a combination of constituent materials suitable for producing a ceramic article which predominately comprises a cordierite crystalline phase. In general, the batch composition comprises a combination of inorganic components including a relatively fine talc, a relatively fine silica-forming source, and an alumina-forming source. In still other embodiments the batch composition may comprise clay, such as, for example, kaolin clay. The cordierite precursor batch composition may also contain organic components such as organic pore formers. For example, the batch composition may comprise a starch which is suitable for use as a pore former and/or other processing aids. In the embodiments described herein, the organic pore former comprises a single material as opposed to a mixture of different organic materials thereby reducing the number of constituent materials in the cordierite precursor batch composition.

In the embodiments described herein, the inorganic batch components and the organic batch components are selected in conjunction with a specific firing cycle so as to yield a porous ceramic honeycomb article comprising a predominant cordierite crystalline phase with a specific microstructure. However, it should be understood that, after firing, the porous ceramic honeycomb article may also include small amounts of mullite, spinel, and/or mixtures thereof. For example, and without limitation, in some embodiments, the porous ceramic honeycomb article may comprise at least 90% by weight, or even at least 95% by weight, or even at least 98%-99% by weight of a cordierite crystalline phase, as measured by x-ray diffraction. The cordierite crystalline phase produced consists essentially of, as characterized in an oxide weight percent basis, from about 49% to about 53% by weight $SiO_2$, from about 33% to about 38% by weight $Al_2O_3$, and from about 12% to about 16% by weight MgO. Moreover, the cordierite crystalline phase stoichiometry approximates $Mg_2Al_4Si_5O_{18}$. The inorganic cordierite precursor batch composition may be appropriately adjusted to achieve the aforementioned oxide weights within the cordierite crystalline phase of the porous ceramic honeycomb article.

In some embodiments described herein, the cordierite precursor batch compositions comprise from about 35% to about 45% by weight of talc. In other embodiments, the cordierite precursor batch composition may comprise from about 38% to about 43% by weight of talc. The talc may have a relatively fine particle size. For example, in some embodiments, the talc has a median particle diameter $d_{pt50}$ of less than or equal to 10 microns, or even a $d_{pt50}$ of less than or equal to 9 microns. In other embodiments, the talc has a median particle diameter $d_{pt50}$ less than 8 microns or even a $d_{pt50}$ less than 6 microns. In still other embodiments the talc may have a median particle size $d_{pt50}$ of less than 5 microns. In one exemplary embodiment, the talc has a median particle size $d_{pt50}$ in the range from about 3 microns to about 10 microns. In another exemplary embodiment, the talc has a median particle size $d_{pt50}$ in the range from about 8 microns to about 10 microns. All particle sizes described herein are measured by a particle size distribution (PSD) technique, preferably by a Sedigraph by Micrometrics.

In some embodiments, the amount of the silica-forming source in the cordierite precursor batch composition is from about 13% to about 24% by weight. In other embodiments, the amount of the silica-forming source in the cordierite precursor batch composition may be from about 15% to about 18% by weight. The silica-forming source generally has a fine particle size. For example, in some embodiments, the silica-forming source has a median particle diameter $d_{ps50}$ of less than or equal to 20 microns, or even a $d_{ps50}$ of less than or equal to 15 microns. In other embodiments, the silica-forming source has a median particle diameter $d_{ps50}$ less than 10 microns. In one embodiment, the silica-forming source is a microcrystalline silica such as Imsil® A-25. However, it should be understood that other silica-forming sources may be used. For example, other suitable silica-forming sources include fused silica; colloidal silica; or crystalline silica such as quartz or crystobalite.

In some embodiments, the amount of the alumina-forming source in the cordierite precursor batch composition is from about 20% to about 35% by weight while in other embodiments the amount of the alumina-forming source in the cordierite precursor batch composition is from about 22% to about 33% by weight. In still other embodiments the amount of the alumina forming source in the cordierite precursor batch composition is from about 26% to about 29% by weight. The alumina-forming source generally has a fine particle size. For example, in some embodiments, the alumina-forming source has a median particle diameter $d_{pa50}$ of less than or equal to 10 microns, or even a $d_{pa50}$ of less than or equal to 8 microns. In other embodiments, the silica-forming source has a median particle diameter $d_{pa50}$ less than 6 microns.

Exemplary alumina-forming sources may include any aluminum oxide or a compound containing aluminum which, when heated to a sufficiently high temperature, yields essentially 100% aluminum oxide, such as alpha-alumina and/or hydrated alumina. Further non-limiting examples of alumina-forming sources include corundum, gamma-alumina, or transitional aluminas. The aluminum hydroxide may comprise gibbsite and bayerite, boehmite, diaspore, aluminum isopropoxide, and the like. If desired, the alumina-forming source may also comprise a dispersible alumina-forming source. As used herein, a dispersible alumina-forming source is one that is at least substantially dispersible in a solvent or liquid medium and that can be used to provide a colloidal suspension in a solvent or liquid medium. In one aspect, a dispersible alumina-forming source can be a relatively high surface area alumina source having a specific surface area of at least 20 $m^2/g$, at least 50 $m^2/g$, or even at least 100 $m^2/g$. A suitable dispersible alumina source comprises alpha aluminum oxide hydroxide AlOOH.x.$H_2O$) commonly referred to as boehmite, pseudoboehmite, and as aluminum monohydrate. In alternative embodiments, the dispersible alumina source can comprise the so-called transition or activated aluminas (i.e., aluminum oxyhydroxide and chi, eta, rho, iota, kappa, gamma, delta, and theta alumina) which can contain various amounts of chemically bound water or hydroxyl functionalities.

In some embodiments, the cordierite precursor batch composition may further comprise clay. The amount of clay in the cordierite precursor batch composition may be from about 0% to about 20% by weight. In another embodiment, the amount of clay in the cordierite precursor batch composition is from about 10% to about 18% by weight or even from about 12% to about 16% by weight. When included in the cordierite batch composition, the clay generally has a median particle size $d_{pc50}$ of less than or equal to 10 microns. In some embodiments, the median particle size $d_{pc50}$ is less than or equal to 5 microns or even less than or equal to 3 microns. Suitable clays which may be included in the cordierite precursor batch composition include, without limitation, raw kaolin clay, calcined kaolin clay, and/or mixtures thereof. Exemplary and non-limiting clays include non-delaminated kaolinite raw clay and delaminated kaolinite.

In the embodiments described herein, the inorganic components of the cordierite batch composition (i.e., talc, silica, alumina and clay) have a median inorganic particle size $d_{50IP}$ less than or equal to 15 microns.

As described herein above, the cordierite precursor batch composition further comprises organic components such as relatively fine pore formers. In the embodiments described herein, an organic pore former is added to the batch composition in an amount sufficient to create a relatively high pore number density with a relatively small median pore size and a relatively narrow pore size distribution. In the embodiments described herein, the cordierite precursor batch composition may comprise greater than or equal to about 30% by weight of an organic pore former. In some embodiments, the amount of pore former added to the batch composition is greater than about 30% by weight. In other embodiments, the amount of pore former added to the batch composition is greater than about 35% by weight. In other embodiments, the amount of pore former added to the batch composition is greater than about 40% by weight. In other embodiments, the amount of pore former added to the batch composition is greater than or equal to about 50% by weight or even greater than or equal to about 55% by weight. In still other embodiments the amount of pore former added to the batch composition is greater than or equal to about 60% by weight. It should be understood that, increasing the amount of pore former in the batch composition increases the pore number density of the porous ceramic honeycomb article after firing. In the embodiments described herein the organic pore former generally has a median particle size 450 less than or equal to 25 microns. In some embodiments, the organic pore former has a median particle size $d_{pp50}$ less than or equal to 20 microns or even less than or equal to 15 microns. In other embodiments, the median particle size 450 is less than or equal to 10 microns. The organic pore former may be a cross-linked pore former (i.e., cross-linked starches and the like) or un-cross-linked pore former. Examples of suitable pore forming materials include, without limitation, cross-linked corn starch, cross-linked wheat starch, cross-linked potato starch, un-cross-linked potato starch, un-cross-linked corn starch, green bean starch, and pea starch.

The inorganic and organic components described above are combined and mixed together with processing aids such as, for example, a binder, and a liquid vehicle, to create a plasticized batch mixture. These processing aids may improve processing and/or reduce drying and/or firing cracking and/or aid in producing desirable properties in the honeycomb article. For example, the binder can include an organic binder. Suitable organic binders include water soluble cellulose ether binders such as methylcellulose, hydroxypropyl methylcellulose, methylcellulose derivatives, hydroxyethyl acrylate, polyvinylalcohol, and/or any combinations thereof. Preferably, the organic binder is present in the composition as a super addition in an amount in the range of from 0.1% to about 10.0% by weight of the inorganic powder batch composition. In another embodiment, the organic binder can be present in the composition as a super addition in an amount in the range of from 2.0% to 8.0% by weight of the inorganic powder batch composition. Incorporation of the organic binder into the plasticized batch composition allows the plasticized batch composition to be readily extruded.

One liquid vehicle for providing a flowable or paste-like consistency to the batch composition is water, although it should be understood that other liquid vehicles exhibiting solvent action with respect to suitable temporary organic binders can be used. The amount of the liquid vehicle component can vary in order to impart optimum handling properties and compatibility with the other components in the batch composition. In some embodiments, the liquid vehicle content is present as a super addition in an amount in the range from 20% to 50% by weight, and in other embodiments in the range from 20% to 35% by weight. Minimization of liquid components in the batch composition can lead to further reductions in undesired drying shrinkage and crack formation during the drying process.

In addition to the liquid vehicle and binder, the plasticized batch composition may include one or more optional forming or processing aids such as, for example, a lubricant. Exemplary lubricants can include tall oil, sodium stearate or other suitable lubricants. The amount of lubricant present in the plasticized batch mixture may be from about 0.5% by weight to about 10% be weight.

It should be understood that the liquid vehicle, pore formers, binders, lubricants and any other processing aids included in the batch composition are added to the batch composition as super additions based upon the weight % of 100% of the inorganic materials.

The combination of inorganic batch components, pore formers, binders, the liquid vehicle, lubricants and any other additives are mixed together in a Littleford mixer and kneaded for approximately 5-20 minutes to produce a plasticized batch composition having the desired plastic formability and green strength to permit the plasticized batch composition to be shaped into a honeycomb article.

The resulting plasticized cordierite precursor batch composition is then shaped into a green body (i.e., a green honeycomb article) by conventional ceramic forming processes, such as, for example, extrusion. When the green honeycomb article is formed by extrusion, the extrusion can be performed using a hydraulic ram extrusion press, or alternatively, a two stage de-airing single auger extruder, or a twin screw mixer with a die assembly attached to the discharge end.

After the plasticized cordierite precursor batch composition has been formed into a green honeycomb article, the green honeycomb article is dried to remove excess liquid from the green honeycomb article. Suitable drying techniques include microwave drying, hot air drying, RF drying or various combinations thereof. After drying, the green honeycomb article is placed in a kiln or furnace and fired under conditions effective to convert the green honeycomb article into a ceramic honeycomb article comprising a primary cordierite crystalline phase, as described herein.

It should be understood that the firing conditions utilized to convert the green honeycomb body into a ceramic honeycomb article can vary depending on the process conditions such as, for example, the specific composition, size of the green honeycomb body, and nature of the equipment used. To that end, in one aspect, the optimal firing conditions specified herein may need to be adapted (i.e., slowed down) for very large cordierite structures, for example.

The firing schedules utilized to produce porous ceramic honeycomb articles having the properties described herein may ramp quickly from 1200° C. to a maximum hold temperature at or above 1420° C., or even at or above 1425° C. The quick ramp rate may be 50° C./hr or higher. In one embodiment, the ramp rate is 75° C./hr or higher. In some embodiments, the green honeycomb bodies may be held at the maximum temperature (i.e., the soak temperature) for 5 to 20 hours. In other embodiments the green honeycomb bodies may be held at the soak temperature from about 10 hours to about 15 hours. In yet other embodiments, the green honeycomb bodies can be fired at a soak temperature in the range of from about 1420° C. to about 1435° C. In still other embodiments, the green body may be fired at a soak temperature in the range of from about 1425° C. to about 1435° C. In one embodiment, the firing cycle includes a quick ramp rate of 50° C./hr or higher from about 1200° C. and a soak temperature in the range from about 1420° C. to about 1435° C. for a sufficient time to form the cordierite crystalline phase in the fired body.

The total firing time may range from approximately 40 to 250 hours, largely depending on the size of the honeycomb article fired, during which time a maximum soak temperature is reached and held for a sufficient time as described above. In one embodiment, the firing schedule includes ramping from 1200° C. at a rate above 50° C./hour and firing at a soak temperature of between about 1425° C. and 1435° C. for between about 10 hours to about 15 hours.

Figure 10:
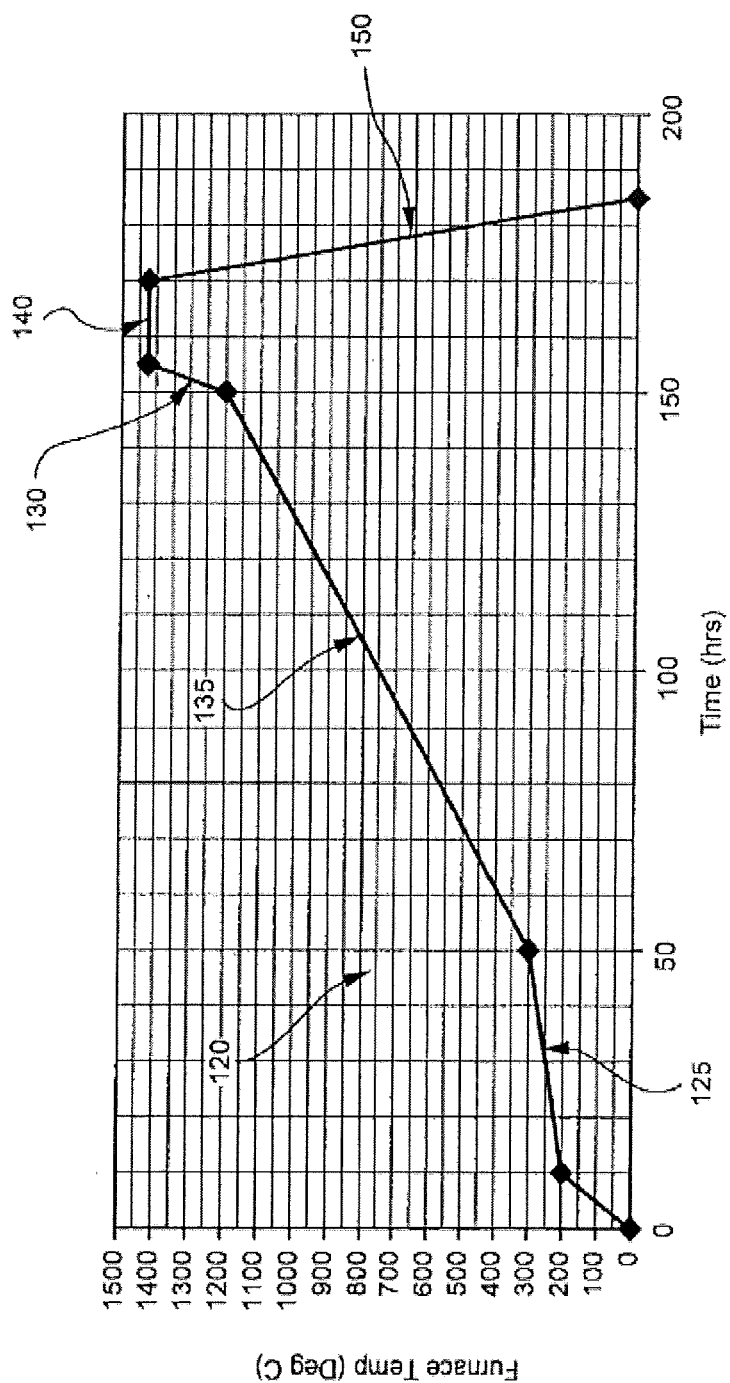
FIG. 10 graphically depicts an exemplary firing schedule for producing a porous ceramic honeycomb body according to one or more embodiments shown and described herein.

Referring now to FIG. 10, one embodiment of a firing schedule utilized to produce porous ceramic honeycomb articles having the properties described herein is graphically illustrated. In this embodiment, an average firing rate may be employed in the first firing portion 120 of the firing schedule. The average firing rate is between about 20° C./hour and about 70° C./hour between room temp and about 1200° C. The first portion 120 of the firing schedule may include a pore former burnout stage 125 which may be a hold or slight ramp within the range of pore former burnout temperatures to minimize cracking and temperature differentials between the skin and the core of the honeycomb. In one embodiment, the burnout stage 125 may be followed by an intermediate ramp 135 to about 1200° C. The upper portion 130 of the firing schedule includes a relatively faster ramp rate at temperatures above 1200° C. This fast ramp in the upper portion 130 may be coupled with a hold portion 140 at a temperature above 1420° C., or even at or above 1425° C., and preferably between 1420° C. and 1435° C. The cordierite crystalline phase of the porous honeycomb ceramic article is formed during this hold portion 140. The ramp rate in the upper portion 130 of the firing cycle may be 50° C./hour or more, 75° C./hour or more, 100° C./hour or more, or even 120° C./hour or more. By utilizing the faster ramp rate in the upper portion 130 above about 1200° C. and the relatively high hold temperature (above 1420° C.), unique microstructure characteristics of the fired ceramic body may be achieved, as will be described in more detail herein.

In particular, the firing cycle described herein aids in reducing the relative amount of fine porosity present in the fired ceramic honeycomb article to below about 4.0 microns. The reduction mechanism is thought to be from the promotion of viscous flow of the cordierite forming components such that fine pores are filled by the viscous flow of the components during the initial formation of the cordierite phase. Following the fast ramp, the honeycomb is held at the soak temperature for a suitable time, such as 5 to 20 hours, to form the cordierite phase. After this, the honeycomb article is cooled to room temperature in portion 150 of the firing schedule. The cooling rate is slow enough to prevent cracking and is dependent on the size of the part fired.

In some embodiments described herein, the LMC porous ceramic honeycomb articles are washcoated with a catalyst washcoat after firing. For example, a slurry of a particulate catalyst washcoating composition can be applied to the surfaces (both internal and external) of the LMC porous ceramic honeycomb article. For example, in the embodiments described herein, the catalyst washcoat has a catalytic function that promotes catalytic reactions involving the reduction of NOx and/or the oxidation of CO, hydrocarbons and NO in an exhaust gas stream which is directed through the porous ceramic honeycomb article. Thus, it should be understood that, in addition to acting as a particulate filter, the porous ceramic honeycomb articles described herein may also exhibit catalyst functionalities and, as such, may be utilized as a 4-way filter deNOx integrated filter (NIF).

In some embodiments, the primary particulate component of the washcoating slurry is alumina. In other embodiments, the primary particulate component is a zeolite, such as Fe-ZSM-5 which may be incorporated in water in an amount from about 7 wt. % to about 12 wt. % to form a catalyst washcoat slurry. However, it should be understood that, in other embodiments, the catalyst washcoat may comprise a different primary particulate component. In some embodiments, the catalyst washcoat may additionally comprise a particulate catalyst such as, by way of example and not limitation, platinum, palladium, rhodium, or any other catalytic material and/or various alloys thereof.

Because the LMC porous ceramic honeycomb article contains relatively few microcracks per unit volume (i.e., because the microcrack parameter $Nb^3$ is from about 0.04 to about 0.25), it is not necessary to apply a preliminary passivation coating to the porous ceramic honeycomb article to prevent the washcoating material from becoming lodged in the microcracks, as is the case for more highly microcracked articles.

Following application of the washcoat to the LMC porous ceramic honeycomb article, the article is exposed to a microcracking condition which increases the number of microcracks per unit volume in the porous ceramic article as described above. In one embodiment, the microcracking condition is a thermal cycle. In this embodiment, the LMC porous ceramic article is heated to a peak temperature and then rapidly cooled. The heating and rapid cooling causes the LMC porous ceramic article to expand and contract thereby causing microcracks to nucleate and grow in the porous ceramic article. In some embodiments, the peak temperature of the thermal cycle is greater than or equal to about 400° C. or even greater than or equal to about 600° C. In general, the peak temperature of the thermal cycle is in the range from about 400° C. to about 800° C. After heating to the peak temperature, the porous ceramic honeycomb article is rapidly cooled at a rate of at least 200° C./hr during which time microcracks are formed throughout the volume of the porous ceramic honeycomb article. By exposing the LMC porous ceramic honeycomb article to the thermal cycle, the LMC porous ceramic honeycomb article becomes a microcracked (MC) porous ceramic honeycomb article.

In another embodiment, the microcracking condition is an acid wash. In this embodiment, the LMC porous ceramic honeycomb article is immersed in an acid solution which precipitates the nucleation and growth of microcracks throughout the honeycomb article. For example, in some embodiments the LMC porous ceramic honeycomb article may be immersed in a solution having a pH of less than 6 or even less than 5 to cause further microcracking in the honeycomb article. By exposing the LMC porous ceramic honeycomb article to the acidic solution, the LMC porous ceramic honeycomb article becomes a microcracked (MC) porous ceramic honeycomb article.

EXAMPLES

The following examples are offered to illustrate specific embodiments of the porous ceramic honeycomb articles described above. It should be understood that the following examples are for purposes of description only and are not intended to limit the scope of the claimed subject matter.

Table 2 lists the compositions of Comparative Example A. Table 3 lists the compositions of Inventive Examples 1-3. As shown in Table 2, Comparative Example A contains a multiple pore formers (graphite and potato starch), both of which have a median particle size of greater than 30 microns. Further, the median particle size of the inorganic components ($d_{IP50}$) is greater than 15 microns.

Inventive Examples 2-3 were formed with a single organic pore former (corn starch) having a media particle size of 15 microns. The composition of the inorganic components of Inventive Examples 1 and 2 were identical. However, Inventive Example 1 contained 30 wt. % pore former while Inventive Example 2 contained 50 wt. % of the same pore former. The alumina source used in Inventive Example 3 had a greater median particle size than the alumina forming sources used in Inventive Examples 1 and 2. The median particle size of the inorganic components ($d_{IP50}$) was less than 15 microns. Specifically, Inventive Examples 1-3 had median particle sizes of 6.3 microns, 6.3 microns and 7.1 microns, respectively.

TABLE 2

Composition of Comparative Examples A and B.

|  | Comp. Ex. A<br>Material Identifier (d50, wt %) | Comp. Ex. B<br>Material Identifier (d50, wt %) |
|---|---|---|
| Inorganic |  |  |
| Talc | FCOR-325 mesh (21.5 μm, 19.26%) | FCOR-325mesh (21.5 μm, 19.26%) |
| Talc | FCOR (25.4 μm, 19.26%) | FCOR (25.4 μm, 19.26%) |
| Silica | Cerasil 300 (26.9 μm, 15.38%) | Cerasil 300 (26.9 μm, 15.38%) |
| Alumina | A10 -325 mesh (10.7 μm, 12.27%) | A10 -325 mesh (10.7 μm, 12.27%) |
| Alumina-Hydrate | Micral 6000 (5.2 μm, 20.99%) | Micral 632 (3.5 μm, 20.99%) |
| Hydrous Clay | CHC-94 (7.3μm,12.84%) | CHC-94 (7.3 μm,12.84%) |
| Additives | Yttrium Oxide -Grade C (0.40%) | Yttrium Oxide -Grade C (0.40%) |
| Pore former |  |  |
| Graphite - 4602 | Graphite - 460 (33μm, 22.00%) | Graphite - 460 (33 μm, 22.00%) |
| Xlinked starch | Potato starch (45μm, 22.00%) | Potato starch (45 μm, 22.00%) |
| Binder and Lubricant |  |  |
| Binder - Methylcellulose | F240 (7.00%) | F240 (7.00%) |
| lubricant | Liga (1.00%) | Liga (1.00%) |

TABLE 3

Compositions of Inventive Examples 1-3.

|  | Inv. Ex. 1<br>Material Identifier<br>(d50, wt %) | Inv. Ex. 2<br>Material Identifier<br>(d50, wt %) | Inv. Ex. 3<br>Material Identifier<br>(d50, wt %) |
|---|---|---|---|
| Inorganic |  |  |  |
| Talc | Barretts 93-37 (9.8 μm, 41.54%) | Barretts 93-37 (9.8 μm, 41.54%) | Barretts 93-37 (9.8 μm, 41.54%) |
| Talc |  |  |  |
| Silica | Imsil A25 (5.4 μm, 16.59%) | Imsil A25 (5.4 μm, 16.59%) | Imsil A25 (5.4 μm, 16.59%) |

TABLE 3-continued

Compositions of Inventive Examples 1-3.

|  | Inv. Ex. 1 Material Identifier (d50, wt %) | Inv. Ex. 2 Material Identifier (d50, wt %) | Inv. Ex. 3 Material Identifier (d50, wt %) |
|---|---|---|---|
| Alumina | A3000 (3.2 μm, 27.93%) | A3000 (3.2 μm, 27.93%) | HVA-FG (5.9 μm, 27.93%) |
| Alumina-Hydrate |  |  |  |
| Hydrous Clay | FHC-03 (3.4 vm, 13.85%) | FHC-03 (3.4 μm, 13.85%) | FHC-03 (3.4 μm, 13.85%) |
| Additives |  |  |  |
| Pore former |  |  |  |
| Graphite - 4602 |  |  |  |
| Xlinked starch | Corn starch (15 μm, 30%) | Corn starch (15 μm, 50%) | Corn starch (15 μm, 30.00%) |
| Binder and Lubricant |  |  |  |
| Binder - Methylcellulose | F240 (7.00%) | F240 (7.00%) | F240 (7.00%) |
| lubricant | Liga (1.00%) | Liga (1.00%) | Liga (1.00%) |

Table 4 lists the pore structure for Comparative Example A and Inventive Examples 1-3. As shown in Table 4, Comparative Example A had a higher porosity than Inventive Examples 1-3. In addition, Comparative Example A also exhibited a greater median pore size $d_{50}$ as well as a greater d-factor $d_f$ and absolute breadth $d_{AbsB}$. The cell geometries for the Inventive Examples and the Comparative Examples are also listed in Table 4. The specific pore volume was calculated from the open frontal area and the porosity of each sample for the cell geometries listed. The open frontal areas for the various geometries are also listed. The bare surface porosities for the Inventive Examples prepared with the listed compositions were expected to be ≥35%. The Inventive Examples prepared according to the listed compositions were also expected to have bare initial filtration efficiencies of 50% or greater.

TABLE 4

Pore Structure of Comparative Example A and Inventive Examples 1-3.

|  | Comp. Ex. A | Comp. Ex. B | Inv. Ex. 1 | Inv. Ex. 2 | Inv. Ex. 3 |
|---|---|---|---|---|---|
| Porosity (%) | 63-66 | 65 | 57 | 62 | 60 |
| d10 - μm | 13.1 | 9.42 | 10.0 | 8.8 | 14.3 |
| d25 - μm | 18.48 | 13.53 | 11.2 | 10.1 | 16.6 |

The single-coat catalyst washcoat loading of the Inventive Examples and the Comparative Example were compared. Samples of the Inventive Examples and the Comparative Example were prepared utilizing the compositions set forth in Tables 2 and 3. The samples were cylindrical with a 2 inch diameter and an axial length of 6 inches. Inventive Examples 1 and 2 were constructed with 300/8 and 300/9 cell geometries, respectively while the Comparative Example A was constructed with a 300/14 cell geometry. Each sample was coated with a single coating of a catalyst slurry which consisted of 12 wt. % of Fe-ZSM-5 zeolite in water using a "water fall" process. The results of the study are presented in Table 5.

TABLE 5

Single-coat catalystwashcoat loading

| Sample | Single-coat catalyst washcoat loading (g/L) |
|---|---|
| Inv. Ex. 2 | 63 g/L |
| Inv. Ex. 3 | 50 g/L |
| Comp. Ex. A | 43 g/L |

As shown in Table 5, Inventive Example 2 exhibited a single-coat catalyst washcoat loading of 63 g/L while Inventive Example 3 exhibited a single-coat catalyst washcoat loading of 50 g/L. However, despite having a greater porosity, median pore size and higher specific pore volume VP, Comparative Example A only exhibited a single-coat catalyst waschcoated loading of 43 g/L. These results unexpectedly demonstrate that, while the Inventive Examples have a thin wall thickness relative to the Comparative Examples (8 and 9 mils compared to 14 mils) and a corresponding lower specific pore volume (approximately 58% of the coating volume of the Comparative Example), the Inventive Examples are capable of coating more catalyst waschcoat per unit volume with a single coating step than the comparative examples.

Figure 11:
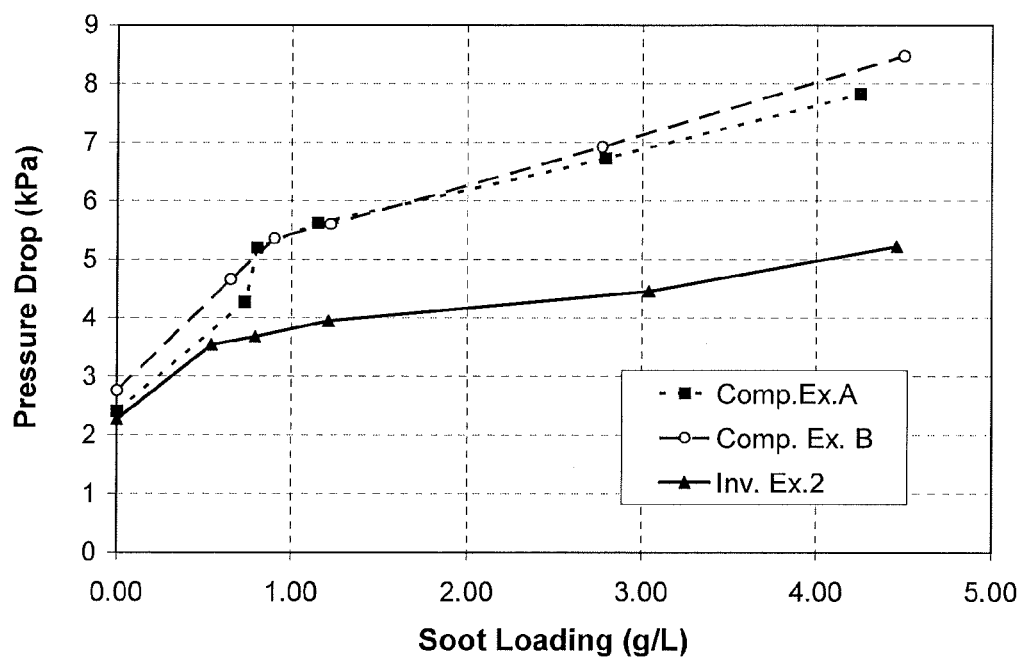
FIG. 11 is a plot of pressure drop (y-axis) as a function of soot loading (x-axis) for an Inventive Example of a porous ceramic honeycomb article coated with catalyst washcoat and Comparative Examples of porous ceramic honeycomb articles coated with a catalyst washcoat.

Referring, now to FIG. 11, a plot of the pressure drop (y-axis) as a function of soot loading is graphically depicted for Inventive Example 2 and Comparative Examples A and B. The porous ceramic article of Inventive Example 2 had a 300/9 cell geometry (i.e., 300 cpsi and a wall thickness of 9 mils), a median pore size of 11.7 microns, a porosity of 62% prior to washcoating, and a d-factor $d_f$ of 0.25. The porous ceramic article of Inventive Example 2 was coated with approximately 101 g/L of a catalyst washcoat containing 12 wt. % Fe-ZSM-5 in water. Comparative Example A had a 300/14 cell geometry, a median pore size of 23 microns, a porosity of 65% and a d-factor $d_f$ of 0.39. The porous ceramic article of Comparative Example A was coated with approximately 106 g/L of a catalyst washcoat containing 12 wt. % Fe-ZSM-5 in water. Comparative Example B had a 300/15 cell geometry, a median pore size of 18 microns, a porosity of 65% and a d-factor $d_f$ of 0.48. The porous ceramic article of Comparative Example B was coated with approximately 89 g/L of a catalyst washcoat containing 12 wt. % Fe-ZSM-5 in water. Each sample was 6" in length and 2" in diameter. The curves were obtained at a flow rate of 26.25 cubic feet per minute. Table 6 contains the pressure values in kPa for the clean back pressure (i.e., the back pressure with no soot loading), and the 5 g/L soot loaded back pressure (i.e., the back pressure when the porous ceramic article is loaded with 5 g of soot per liter of the porous ceramic honeycomb). Printex U was used as soot and was loaded into each sample at a constant flow rate.

TABLE 6

Back Pressure - clean and soot loaded

| Sample | Clean back pressure (kPa) | 5 g/L soot loaded back pressure (kPa) |
|---|---|---|
| Inv. Ex. 2 | 2.3 | 5.5 |
| Comp. Ex. A | 2.4 | 8.0 |
| Comp. Ex. B | 2.8 | 8.9 |

As shown in Table 6, Inventive Example 2 exhibited a lower 5 g/L soot loaded back pressure drop than Comparative Examples A and B at a higher catalyst washcoat loading despite having a lower porosity, lower specific pore volume VP and smaller median pore size.

Figure 12:
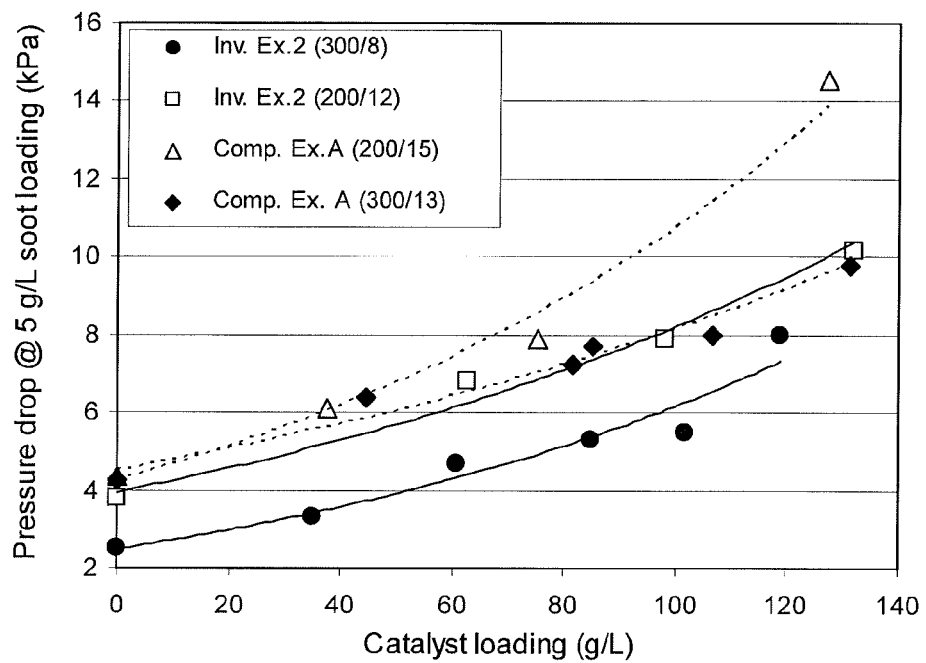
FIG. 12 is a plot of pressure drop (y-axis) as a function of catalyst loading (x-axis) for an Inventive Example of a porous ceramic honeycomb article coated with catalyst washcoat and Comparative Examples of porous ceramic honeycomb articles coated with a catalyst washcoat.

Referring to FIG. 12, a plot of the 5 g/L soot loaded pressure drop as a function of the amount of catalyst washcoat loading is graphically depicted. Results are shown for samples produced from the composition of Inventive Example 2 with 200/12 and 300/8 geometries. Results are also shown for sample produced from the composition of Comparative Example A with a 200/15 geometry and a 300/13 geometry. As shown in FIG. 12, Inventive Example 2 exhibits a lower pressure drop at a catalyst washcoat loading of up to approximately 120 g/L. FIG. 12 illustrates a lower soot loaded pressure drop for the Inventive Example 2 with a 300/8 geometry despite having a smaller pore size and narrower pore size distribution. In addition, FIG. 12 illustrates that the thin wall filter of Inventive Example 2 with a 300/8 geometry exhibits an even lower pressure drop than a filter having the same composition but with a 200/12 geometry, indicating that it is possible to construct a thin wall filter with a small pore size distribution without incurring a loss of filtration efficiency.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for making a porous ceramic honeycomb article, the method comprising:
   mixing a batch of inorganic components with an organic pore former and at least one processing aid to form a plasticized batch, wherein:
      the batch of inorganic components has a median inorganic particle size $d_{50IP} \leq 15$ microns and comprise talc having $d_{pt50} \leq 10$ μm, a silica-forming source having $d_{ps50} \leq 20$ μm, and an alumina-forming source having a median particle diameter $d_{pa50} \leq 10.0$ μm, wherein $d_{ps50}$ is a median particle diameter of the silica-forming source, $d_{pa50}$ is a median particle diameter of the alumina-forming source and $d_{pt50}$ is a median particle diameter of the talc;
      the organic pore former is present in the plasticized batch in an amount greater than at least 30 wt. % of the inorganic components, the organic pore former having $d_{50} \leq 25$ μm, wherein $d_{50}$ is a median particle diameter of the organic pore former;
   forming the plasticized batch into a green honeycomb article;
   burning the organic pore former out of the green honeycomb article;
   firing the green honeycomb article under conditions effective to form the porous ceramic honeycomb article comprising:
      a cordierite crystal phase having a microcrack parameter ($Nb^3$) of from about 0.04 to about 0.25;
      a porosity P % ≥ 55%;
      a median pore size ≤ 20 microns;
      a wall thickness T, wherein $(11+(300-CD)*0.03) \geq T \geq (8+(300-CD)*0.02)$, wherein the wall thickness T is in units of mils; and
      a pore size distribution with a d-factor of ≤ 0.35, wherein the d-factor = (d50−d10)/d50; and
   subsequent to firing, exposing the porous ceramic honeycomb article to a microcracking condition, wherein after exposure to the microcracking condition, the porous ceramic honeycomb article comprises a microcrack parameter ($Nb^3$) is at least 20% greater than the microcrack parameter prior to exposure to the microcracking condition.

2. The method of claim 1, wherein the microcracking condition comprises a thermal cycle in which the porous ceramic honeycomb article is heated to a peak temperature of at least 400° C. and after the porous ceramic honeycomb article reaches the peak temperature, the porous ceramic honeycomb article is cooled at a rate of at least 200° C./hr.

3. The method of claim 1, wherein a bare initial filtration efficiency and a coated initial filtration efficiency of the porous ceramic honeycomb article are ≥ 50%.

4. The method of claim 1, wherein the porous ceramic honeycomb article has a surface porosity of greater than 35%.

5. The method of claim 1, wherein the pore size distribution of the porous ceramic honeycomb article has an absolute breadth $d_{Absb} \leq 10$ microns, wherein $d_{Absb} = d_{75} - d_{25}$.

6. The method of claim 1, wherein the porous ceramic honeycomb article exhibits:
   a coated pressure drop increase of ≤ 8 kPa at a flow rate of 26.5 cubic feet per minute when coated with 100 g/L of a washcoat catalyst and loaded with 5 g/L of soot; and
   a bare pressure drop increase of ≤ 4 kPa when loaded with 5 g/L of soot.

* * * * *

UNITED STATES PATENT AND TRADEMARK OFFICE
CERTIFICATE OF CORRECTION

PATENT NO. : 8,673,207 B1  
APPLICATION NO. : 14/079753  
DATED : March 18, 2014  
INVENTOR(S) : Thorsten Rolf Boger et al.

It is certified that error appears in the above-identified patent and that said Letters Patent is hereby corrected as shown below:

In the Claims

| No. | Col. | Line | Description |
| --- | --- | --- | --- |
| 1 | 24 | 10 | "ing $d_{50} \leq 25$ µm," – should read "ing $d_{pp50} \leq 25$µm," |
| 2 | 24 | 10 | "wherein $d_{50}$ is a median"– should read "wherein $d_{pp50}$ is a median" |

Signed and Sealed this  
Twenty-ninth Day of July, 2014

Michelle K. Lee  
*Deputy Director of the United States Patent and Trademark Office*